Mar. 27, 1923.

W. B. MURPHY.
SEPARABLE FASTENER.
FILED MAR. 8, 1922.

1,449,690.

INVENTOR,
William B. Murphy
By N. J. Bernhard
Attorney.

Patented Mar. 27, 1923.

1,449,690

UNITED STATES PATENT OFFICE.

WILLIAM B. MURPHY, OF WEEHAWKEN, NEW JERSEY, ASSIGNOR TO DEFIANCE BUTTON MACHINE CO., OF NEW YORK, N. Y., A CORPORATION OF NEW YORK.

SEPARABLE FASTENER.

Application filed March 8, 1922. Serial No. 541,904.

*To all whom it may concern:*

Be it known that I, WILLIAM B. MURPHY, a citizen of the United States, residing at Weehawken, county of Hudson, State of New Jersey, have invented a certain new and useful Separable Fastener, of which the following is a specification.

This invention is a separable fastener, the improvement in which pertains more particularly to the socket member of a two part fastener, the stud member of which two part fastener is adapted for co-operation with my improved socket member.

My socket member is composed of two parts, a cap and a hollow stud, said stud being expanded within said cap for the attachment of the socket member as a unit to fabric or other material.

The object of my invention is, first, to adapt the socket member for permanent attachment to material of varying thicknesses or to two or more superposed layers of material; second to apply the cap and stud to material without perforating said material, and, third, to assemble the cap and the stud in an attached relation to each other and to the material without distorting the cap under the pressure required to effect the expansion of the stud in the operation of connecting the cap and the stud in permanent relation to the material.

To these ends, the invention comprises a cap provided with teeth disposed in a plane inclined to the diametrical axis of said cap, in combination with a tubular stud expanded within the cap, whereby the stud and the cap co-operate in gripping the material for effecting the permanent attachment of the resulting socket member to said material.

In my invention the teeth of the cap penetrate the material so as to become embedded therein, said teeth remaining in the inclined relation to the cap subsequent to the expansion of the split stud within said cap; in other words, the teeth are not bent, deflected or otherwise changed by the expansion of the stud. Furthermore, the stud is expanded within the cap without distorting said cap or changing the position of the teeth of said cap.

Other functions and advantages of the invention will appear from the following description taken in connection with the drawings, wherein—

A is the cap and B the tubular stud composing the two parts of my socket member.

The cap is composed of a single piece of material suitable for the purpose, it being preferred to use sheet metal in the production of said cap. The metal is cut or stamped in blank form with a serrated or toothed edge, and said metal is drawn, or otherwise manipulated by those skilled in the art, to produce a cap of the cross sectional form shown more clearly in Figures 2 to 6, inclusive, wherein $a$ is the closed wall or face, $b$ the rim and $c$ the teeth on the edge of said rim. As shown, the face or wall $a$ is arched or crowned in cross section whereas the rim $b$ is curled or rounded to occupy an overhanging relation to the face $a$, the resulting product being a one-piece cap of hollow or chambered formation.

An essential feature of my cap consists in the teeth $c$ constituted by the serrated or saw toothed formation of the metal stamping. Said teeth $c$ are on the edge of the curled rim $b$, and they are at all times inclined to the diametrical axis of the chambered cap. Said teeth are in converging relation so as to produce a throat the diameter of which is less than the diameter of the cap in the plane of the curled rim $b$.

The tubular stud B is a member of desired construction, such as is commonly referred to in the art as a split eyelet, comprising a tubular part closed at one end by a head $d$, and split or divided at $e$ and furnished at the base with a flange $f$.

My socket member is applied to the material without performing the operation of perforating said material, and, furthermore, the cap and the split stud are attached permanently to material which varies in thickness.

Figure 6:
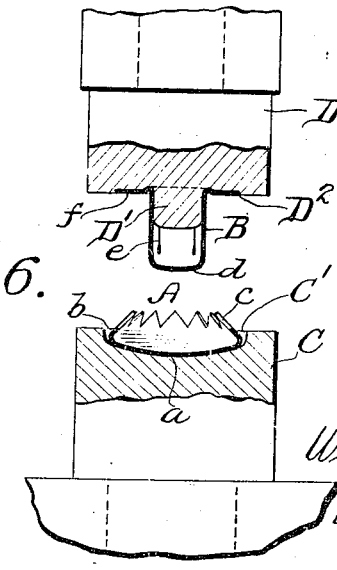
Figure 6 is a view partly in section and partly in elevation illustrating the mode of, and one embodiment of means for, uniting the cap and the tubular stud to produce a socket member in accordance with my invention.

Suitable means are usually employed for the attachment of the cap and the stud to each other and to the material, one embodiment of attaching means suitable for the purpose being represented in Figure 6, wherein C is a female die with a cavity $C'$ and D is a male die with a plunger $D'$ and a recess $D^2$.

Figure 1:
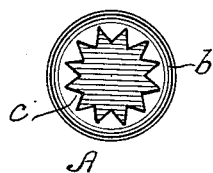
Figure 1 is a plan view and Figure 2 a vertical cross sectional view of a cap embodying my invention.
Figure 2:
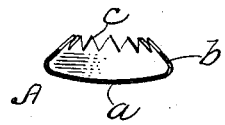
Figure 3:
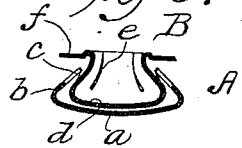
Figure 3 is a sectional view through the cap and the tubular stud comprising the socket member of a separable fastener, the material being omitted.
Figure 4:
Figures 4 and 5 are sectional views through the assembled parts of the socket member applied to one thickness of material in Figure 4 and several thicknesses of material in Figure 5.
Figure 5:
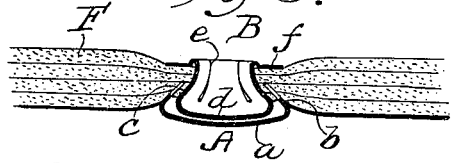

To attach the socket member to material such as E in Figure 4 and to material as F in Figure 5, the cap A is placed within the cavity $C'$ of the female die and the split stud or eyelet B is slipped over the plunger $D'$ of male die D, substantially as shown in Figure 6, the flange $f$ of the stud A occupying the recess $D^2$ of said male die.

The material is placed between the two dies, over the cap A, and movement is then imparted to one or both dies for closing them. At this stage in the operation, the inclined teeth $c$ of the cap are forced into the material and the tubular stud is pressed through said material so that the closed end $d$ of the stud is pressed into forcible contact with the inner face of the chambered cap, with the result that the continued application of pressure upsets the metal of the stud and expands said stud within the chamber of the cap and without distorting said cap or bending the teeth $c$. Said teeth of the cap are embedded into the material while retaining their initial inclined relation to the diameter of said cap, but the material is gripped between the expanded stud and the toothed face of the cap.

My construction facilitates the attachment of the two parts A B to material, for the reason that it is not necessary to perforate said material for the passage of the expansible stud, and, furthermore, the said two parts are applied permanently to a single thickness of material, such as E in Figure 4, or to multiple thicknesses of material as at F in Figure 5, for the reason that the inclined teeth $c$ cut into the material around the space to be penetrated by the stud, thus attaching the parts A B with facility and increasing the utility of the socket member by making provision for its permanent attachment to materials which vary in thickness.

Having thus fully described the invention, what I claim as new and desire to secure by Letters Patent is:

1. A socket member of the class described embodying a cap provided with fabric penetrating teeth, said teeth occupying permanently an inclined relation to the diameter of said cap, and a tubular stud expanded within said cap.

2. A socket member of the class described embodying a cap of hollow formation and provided with teeth positioned for penetrating the material around a definite part thereof, and a tubular stud adapted to be expanded within said hollow cap while leaving the teeth unaffected by the expansion thereof within said cap.

3. A socket member of the class described embodying a chambered cap provided at the margin thereof with a series of penetrating teeth inclined to the plane of the transverse diameter of said cap, and a tubular stud expanded within said cap without distorting the teeth thereof.

4. A socket member of the class described embodying a chambered cap the margin of which is curled and provided with a series of penetrating teeth inclined normally to the plane of the transverse diameter through the cap, and a stud expanded within said chamber of the cap without distorting the position of said teeth, the toothed portion of said cap and the face of the expanded stud mutually cooperating in gripping material interposed between said faces of the cap and the stud.

5. A socket member of the class described embodying a chambered cap of arched cross formation and the margin of which is curled and provided with a continuous series of penetrating teeth inclined normally to the plane of transverse diameter of said cap, and a closed end stud adapted by impact with the crowned face of the cap to be expanded within the chamber of said cap without distorting the inclined relation of said teeth to said cap.

In testimony whereof I have hereto signed my name this 7th day of March, 1922.

WILLIAM B. MURPHY.